United States Patent
Ruckart (10) Patent No.: US 9,491,275 B2
(45) Date of Patent: Nov. 8, 2016

(54) SYSTEMS, METHODS AND COMPUTER PROGRAM PRODUCTS FOR AGGREGATING CONTACT INFORMATION

(75) Inventor: John Ruckart, Altanta, GA (US)

(73) Assignees: AT&T Intellectual Property I, L.P., by transfer of ownership from AT&T, Atlanta, GA (US); Delaware Intellectual Property, Inc., Atlanta, GA (US)

( * ) Notice: Subject to any disclaimer, the term of this patent is extended or adjusted under 35 U.S.C. 154(b) by 1097 days.

(21) Appl. No.: 11/321,336

(22) Filed: Dec. 29, 2005

(65) Prior Publication Data

US 2007/0064920 A1    Mar. 22, 2007

Related U.S. Application Data

(60) Provisional application No. 60/717,363, filed on Sep. 15, 2005.

(51) Int. Cl.
| | | |
|---|---|---|
| G06F 17/30 | (2006.01) | |
| H04M 1/2745 | (2006.01) | |
| G06Q 10/10 | (2012.01) | |

(Continued)

(52) U.S. Cl.
CPC ..... *H04M 1/274516* (2013.01); *G06Q 10/109* (2013.01); *H04M 3/4931* (2013.01); *H04L 12/581* (2013.01); *H04L 51/04* (2013.01); *H04M 2203/553* (2013.01)

(58) Field of Classification Search
CPC .............................. G06F 17/30; G06F 17/00
USPC ......... 707/1, 2, 3, 5, 10, 200, 201, 202, 204
See application file for complete search history.

(56) References Cited

U.S. PATENT DOCUMENTS 3,819,377 A * 6/1974 Klose ....................... G03C 5/56
                                                     430/20
4,586,827 A * 5/1986 Hirsch et al. ................. 368/282

(Continued)

OTHER PUBLICATIONS

Critical Path News Release, "Critical Path's Extensible Universal Address Book Provides Foundation for New Value-Added Services for Carriers," http://www.criticalpath.net/en/76/pressreleases/?news-498105, San Francisco, CA, Feb. 24, 2004, 2 pages.

(Continued)

*Primary Examiner* — Farhan Syed
(74) *Attorney, Agent, or Firm* — Myers Bigel & Sibley, P.A.

(57) ABSTRACT

A service provider for a communications system may detect new contact information for a contact in the contact database of a first one of the subscribers. The service provider obtains a confirmation of the new contact information by a party other than the first subscriber to confirm accuracy of the new contact information. Responsive to detection of the confirmation event, the service provider stores the confirmed contact information in an aggregate contact database including contact data from multiple ones of the plurality of subscribers. The new contact information may include a communications identifier, such as a telephone number, physical address or network address. The new contact information may further include personal information for the contact, such as a photograph, a profile, a weblog, a buddy list, a bookmark and/or a tag, or commercial information associated with the contact, such as a user rating, an advertisement and/or a coupon.

12 Claims, 5 Drawing Sheets

(51) Int. Cl.
*H04M 3/493* (2006.01)
*H04L 12/58* (2006.01)

(56) References Cited

U.S. PATENT DOCUMENTS

| | | | | |
|---|---|---|---|---|
| 4,604,847 | A * | 8/1986 | Moulding, Jr. | A61J 7/0084 128/203.15 |
| 4,825,056 | A * | 4/1989 | Ohta et al. | 235/449 |
| 4,839,509 | A * | 6/1989 | Yasuma et al. | 235/482 |
| 4,925,776 | A * | 5/1990 | Ohta et al. | 430/321 |
| 5,000,694 | A * | 3/1991 | Komatsu | 439/260 |
| 5,182,714 | A * | 1/1993 | Matsuura | 700/161 |
| 5,218,190 | A * | 6/1993 | Hardesty et al. | 235/462.01 |
| 5,238,107 | A * | 8/1993 | Kownacki | 206/308.1 |
| 5,311,175 | A * | 5/1994 | Waldman | 341/34 |
| 5,311,866 | A * | 5/1994 | Kagan et al. | 600/374 |
| 5,349,445 | A * | 9/1994 | Chang | 358/296 |
| 5,386,131 | A * | 1/1995 | Sato | 257/301 |
| 5,396,388 | A * | 3/1995 | Brown | 360/265 |
| 5,422,473 | A * | 6/1995 | Kamata | 235/384 |
| 5,422,766 | A * | 6/1995 | Hack et al. | 360/99.18 |
| 5,438,695 | A * | 8/1995 | Morimura | H04M 1/72505 340/7.38 |
| 5,475,471 | A * | 12/1995 | Kisu et al. | 399/115 |
| 5,534,686 | A * | 7/1996 | Kowalski et al. | 235/492 |
| 5,550,691 | A * | 8/1996 | Hamiton | 360/246.1 |
| 5,629,667 | A * | 5/1997 | Nyberg | 340/330 |
| 5,762,516 | A * | 6/1998 | Itoga et al. | 439/404 |
| 5,822,154 | A * | 10/1998 | Takahashi et al. | 369/13.17 |
| 5,880,452 | A * | 3/1999 | Plesko | 235/472.01 |
| 5,969,332 | A * | 10/1999 | Ueda et al. | 235/492 |
| 5,987,113 | A * | 11/1999 | James | H04M 3/42229 379/211.01 |
| 6,041,019 | A * | 3/2000 | Jackson et al. | 367/124 |
| 6,160,685 | A * | 12/2000 | Hamilton | 360/246.2 |
| 6,463,437 | B1 * | 10/2002 | Mongilio | 707/10 |
| 6,493,722 | B1 * | 12/2002 | Daleen | G06Q 30/02 |
| 6,701,348 | B2 * | 3/2004 | Sommerer | 709/206 |
| 6,714,519 | B2 * | 3/2004 | Luzzatti | H04L 12/6418 370/252 |
| 6,731,927 | B1 * | 5/2004 | Stern | H04M 3/4931 379/218.01 |
| 7,184,754 | B1 * | 2/2007 | Farmar | 455/414.1 |
| 7,590,539 | B1 * | 9/2009 | Kirkpatrick | H04L 12/587 379/88.01 |
| 7,676,033 | B2 * | 3/2010 | Madhusudan | H04M 3/56 379/202.01 |
| 7,739,602 | B2 * | 6/2010 | Feng | G06Q 10/10 709/201 |
| 8,014,497 | B2 * | 9/2011 | Brunson | H04L 12/58 370/352 |
| 2002/0024947 | A1 * | 2/2002 | Luzzatti | H04L 12/6418 370/352 |
| 2002/0080413 | A1 * | 6/2002 | Sommerer | 358/402 |
| 2002/0194062 | A1 * | 12/2002 | Linde | 705/14 |
| 2003/0011682 | A1 * | 1/2003 | Sellen et al. | 348/207.1 |
| 2004/0059786 | A1 * | 3/2004 | Caughey | 709/206 |
| 2004/0127193 | A1 * | 7/2004 | Timmins | H04L 12/2854 455/405 |
| 2004/0267625 | A1 * | 12/2004 | Feng | G06Q 10/10 715/733 |
| 2006/0037076 | A1 * | 2/2006 | Roy | 726/22 |
| 2006/0052091 | A1 * | 3/2006 | Onyon | H04L 29/12047 455/415 |
| 2006/0112086 | A1 * | 5/2006 | Douress | G06F 17/3087 |
| 2006/0195472 | A1 * | 8/2006 | Cadiz et al. | 707/104.1 |
| 2006/0195474 | A1 * | 8/2006 | Cadiz et al. | 707/104.1 |
| 2007/0027930 | A1 * | 2/2007 | Alvarado et al. | 707/200 |
| 2007/0047715 | A1 * | 3/2007 | Madhusudan | H04M 3/56 379/202.01 |
| 2007/0121808 | A1 * | 5/2007 | Brunson | H04L 12/58 379/67.1 |
| 2008/0235242 | A1 * | 9/2008 | Swanburg | H04L 29/12047 |
| 2009/0147937 | A1 * | 6/2009 | Sullhan | H04M 3/42068 379/201.02 |
| 2009/0187623 | A1 * | 7/2009 | Narayanaswami | G06Q 10/107 709/204 |
| 2010/0299611 | A1 * | 11/2010 | Feng | G06Q 10/10 715/744 |
| 2010/0313142 | A1 * | 12/2010 | Brown | G06F 17/30699 715/747 |
| 2012/0005025 | A1 * | 1/2012 | Aaltonen | G06Q 30/02 705/14.64 |

OTHER PUBLICATIONS

Toporek, Chuck, "A User's Guide to Mac OS X, Pocket Guide," No date, pp. 9-17.
"Oracle Collaboration Suite Connector for Outlook 10g Overview," Aug. 2005, pp. 1-4.
"Good Contacts: How it Works," http://www.goodcontacts.com/products/how.php, 2005, 2 pages.
"Good Contacts: Application Note-Sharing Outlook Folders," http://www.goodcontacts.com/support/apn_shared.htm, Copyright 2001-2004, 4 pages.
"Good Contacts Synchronizer Solution™," 2003, 2 pages.
"Installation and User's Guide, OfficeCalendar for Microsoft® Outlook™—Sharing Microsoft Outlook Calendar and Contacts without Exchange Server," Copyright 2003-2005, 53 pages.

* cited by examiner

SYSTEMS, METHODS AND COMPUTER PROGRAM PRODUCTS FOR AGGREGATING CONTACT INFORMATION

CROSS REFERENCE TO RELATED APPLICATION

This application is related to and claims the priority of U.S. Provisional Patent Application Ser. No. 60/717,363, filed Sep. 15, 2005, entitled Systems and Methods for Aggregating Information in a Universal Address Book, the disclosure of which is hereby incorporated herein by reference.

BACKGROUND

The present invention generally relates to the field of communications services and, more particularly, to contact databases for communications services.

A wide variety of means exist for communication between users. For example, a user may be contacted via a home phone, work phone, mobile phone etc. In addition, users may also communicate using devices such as PC's, PDA's, pagers, etc. using, for example, email and instant messaging.

With the proliferation of different types of communications, managing communications contacts has generally become more complex and burdensome. For example, a person may have a work phone number, a home telephone number, a cellular telephone number, a work e-mail address, a home e-mail address, and other contact identifiers. Therefore, managing such a variety of information in, for example, an address book, may be difficult and prone to error.

Techniques have been developed for sharing contact information among multiple users. For example, applications have been developed to allow sharing of contact folders among Outlook® users. However, such an approach may not actually merge contact information. Such systems also may not resolve conflicts between information in folders.

Critical Path, Inc. of San Francisco, Calif., has announced development of an extensible Universal Address Book that allows telecommunications carriers to provide end-to-end synchronization and contact sharing among subscribers. The system stores subscribers' address books on the carrier's network and synchronizes that data across all of their messaging services and devices. The system lets subscribers enable automatic updates of entries in their address book whenever contacts change their information. These updates are sent to the subscribers' devices and applications. Subscribers can automatically be connected to other subscribers' dynamic content information whenever a new email address is entered into an address book. The Critical Path Universal Address Book is described at http://www.criticalpath.net.

SUMMARY OF THE INVENTION

Some embodiments of the present invention provide methods of operating a communications system having a plurality of subscribers, each of the subscribers managing a respective contact database (e.g., address book). A service provider for the communications system may detect new contact information for a contact in the contact database of a first one of the subscribers. The service provider obtains a confirmation of the new contact information by a party other than the first subscriber to confirm accuracy of the new contact information. Responsive to detection of the confirmation event, the service provider stores the confirmed contact information in an aggregate contact database including contact data from multiple ones of the plurality of subscribers. For example, in some embodiments, the service provider may transmit a confirmation query to the contact, and may detect a confirmation in response to the query. In some embodiments, the service provider may group the detected new contact information with new contact information previously received from at least one other subscriber that substantially matches the detected new contact information. The service provider may detect the confirmation responsive to a number of occurrences of substantially matching new contact information in the grouped contact information exceeding a predetermined threshold. In still other embodiments, detecting a confirmation includes detecting at least one successful communication by at least one of the plurality of subscribers using the detected new contact information.

The new contact information may include a communications identifier, such as a telephone number, physical address or network address. The new contact information may further include personal information for the contact, such as a photograph, a profile, a weblog, a buddy list, a bookmark and/or a tag. The new contact information may also include commercial information associated with the contact, such as a user rating, an advertisement and/or a coupon. The service provider may provide access to the commercial information in the aggregate database to a second one of the subscribers, e.g., by publishing the commercial information in a database available to at least a subset of the plurality of subscribers. Embodiments of the present invention also include systems and computer program products configured to carry out such methods.

In further embodiments of the present invention, methods are provided for managing commercial information in a communications system having a plurality of subscribers. A service provider receives contact information including commercial information associated therewith from respective contact databases of respective ones of its subscribers. The service provider stores the commercial information in an aggregate contact database accessible to at least some of the plurality of subscribers. The commercial information may include, for example, a user rating, an advertisement and/or a coupon. Systems and computer program products implementing such methods are also provided.

DETAILED DESCRIPTION OF EMBODIMENTS OF THE INVENTION

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or flowchart illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
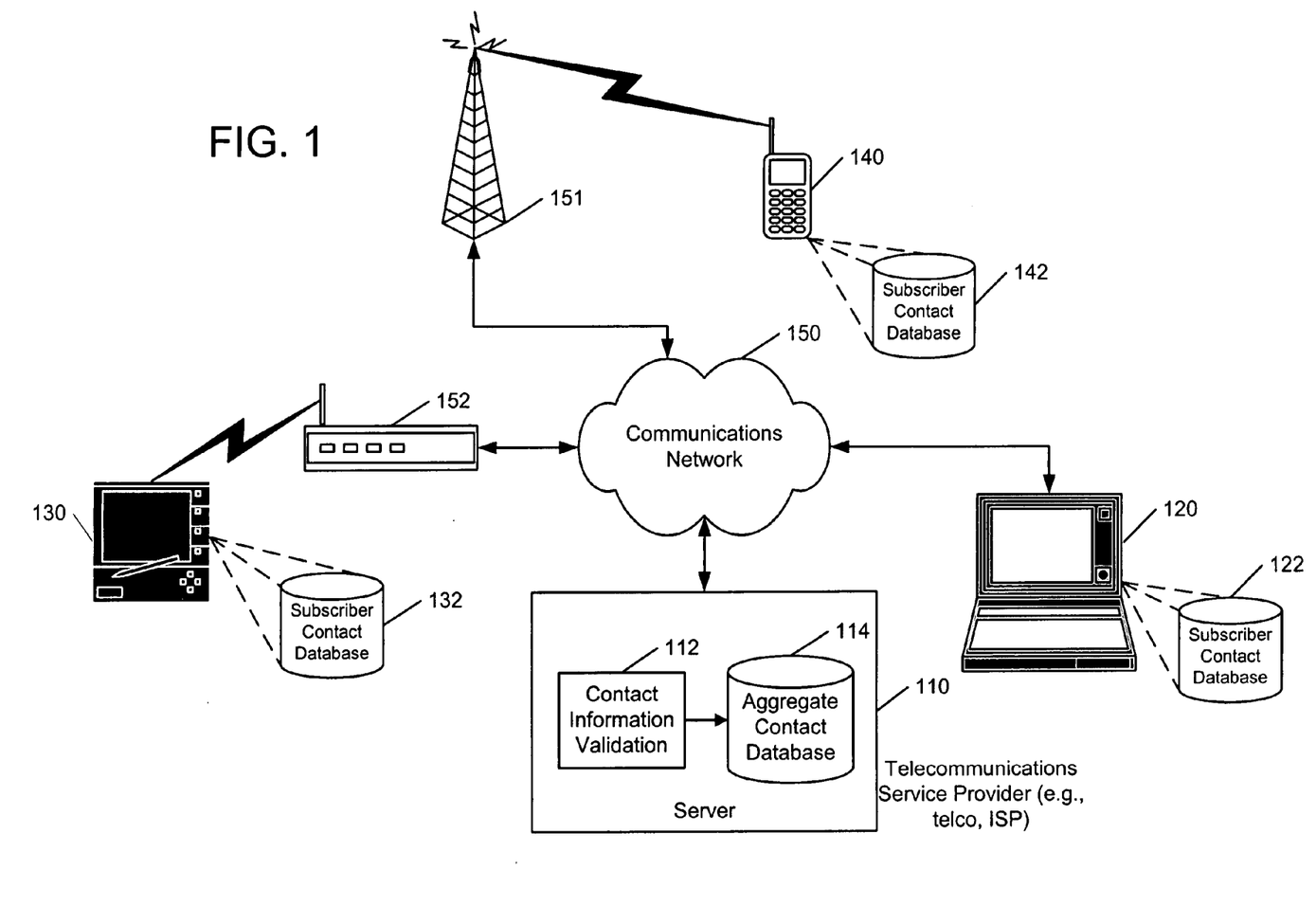
FIG. 1 is a schematic diagram illustrating systems and operations for contact information management in a communications system according to some embodiments of the present invention.

FIG. 1 illustrates contact information management apparatus and operations according to some embodiments of the present invention. A plurality of subscribers, here shown as including a laptop-equipped subscriber 120, a PDA-equipped subscriber 130 and a mobile-terminal-equipped subscriber 140, are coupled via a communications network 150 to a serer 110 maintained by a communications service provider that serves the subscribers 120, 130, 140. As shown, the communications network 140 may include various communications devices, such as wireless base stations 151 and wireless routers 152.

Each of the subscribers 130 manages a respective contact information database 122, 132, 142, e.g., an electronic address book or similar contact database that holds telephone numbers, mailing addresses, e-mail addresses, websites, and other contact information pertinent to contacts. The subscriber contact databases 122, 132, 142 may be resident at the respective subscriber devices 120, 130, 140 and/or may be located outside of the subscriber device 120, 130, 140, e.g., at a website that is accessible to the devices 120, 130, 140. The service provider server 110 hosts an aggregate contact database 114 that stores contact information that is a union of contact information provided by the subscriber contact databases 122, 132, 142. Contact information is selectively stored in the aggregate contact database 114 under control of a contact information validation application 112, which conditions entry of contact information in the aggregate database 114 on confirmation received from the subscribers 122, 132, 144 or other parties.

Figure 2:
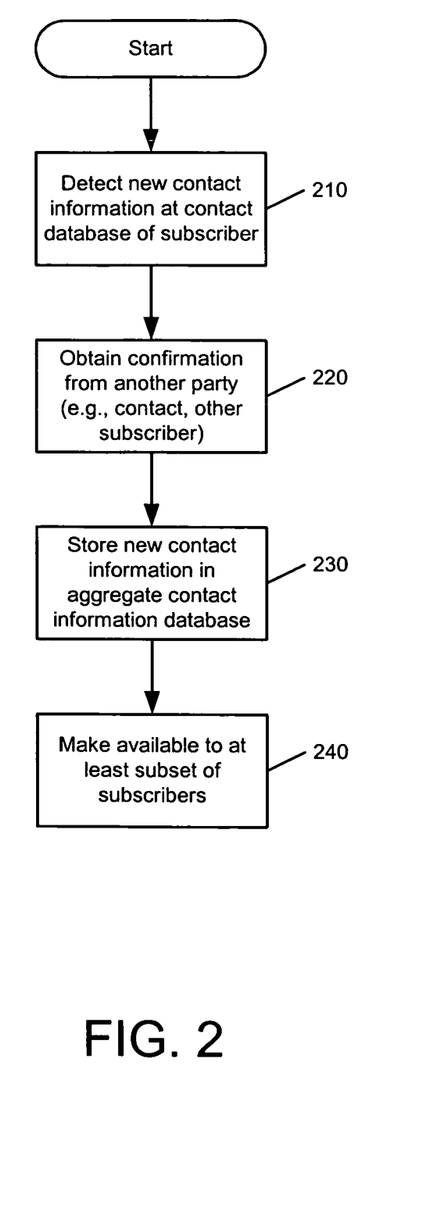
FIGS. 2-6 are flowcharts illustrating contact information management operations according to further embodiments of the present invention.

FIG. 2 illustrates exemplary operations according to some embodiments of the present invention. A service provider detects the presence of new contact information at a contact database of one of its subscribers (block 210). For example, the new contact information may be contact information entered by the subscriber into the subscriber contact database. The service provider then obtains confirmation of the new contact information from a party other than the subscriber (block 220). It will be appreciated that confirmation of new contact information may be foregone if the information is indicated as "private" or otherwise restricted. Upon obtaining the confirmation, the service provider stores the new contact information in its aggregate contact information database (block 230), which is made available to at least a subset of the service provider's subscribers (block 240). For example, subscribers could be provided with direct access to the aggregate database, e.g., via website or by electronic publication via email or other means, and/or contact information from the aggregate database could be downloaded to local subscriber contact databases in a synchronization operation. Access to information in the aggregate contact database may be selective. For example, the service provider may determine that there are constraints on distribution of the detected new content information, e.g., the subscriber entering the new contact information may have marked it as private or to be limited to distribution to a limited group of subscribers. Accordingly, the service provider may limit access to the new contact information in the aggregate contact database to the identified group.

Figure 3:
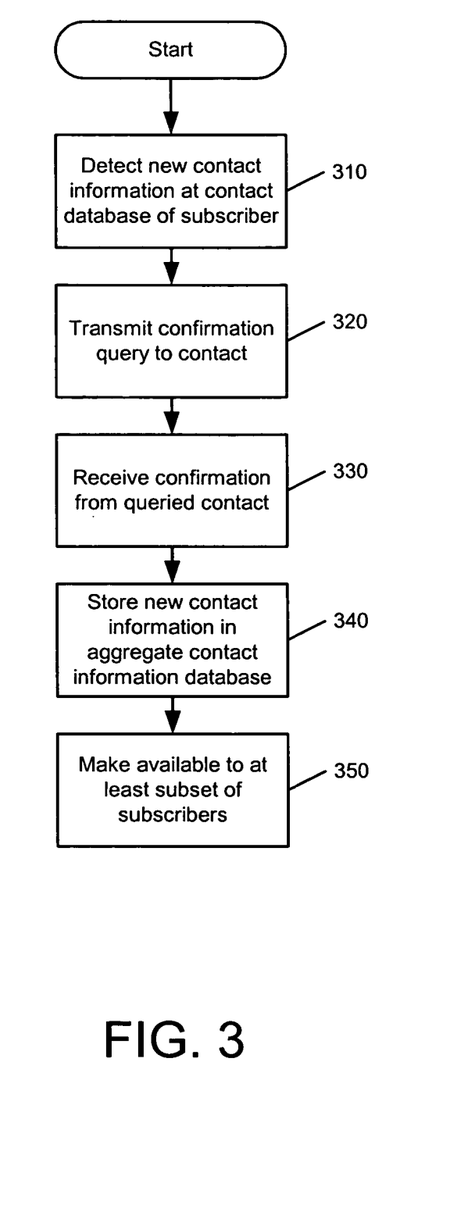

Confirmation of new contact information can be obtained in a number of different ways according to various embodiments of the present invention. For example, in some embodiments of the present invention illustrated in FIG. 3, a service provider detects new contact information in the contact database of the subscriber (block 310). In response, the service provider transmits a confirmation query to the contact associate with the new contact information (block 320). In response to this query, the service provider may receive a confirmation (block 330), thus causing the service provider to store the new contact information in its aggregate contact database (block 340). The new information may then be made available to a least some other subscribers (block 350).

Figure 4:
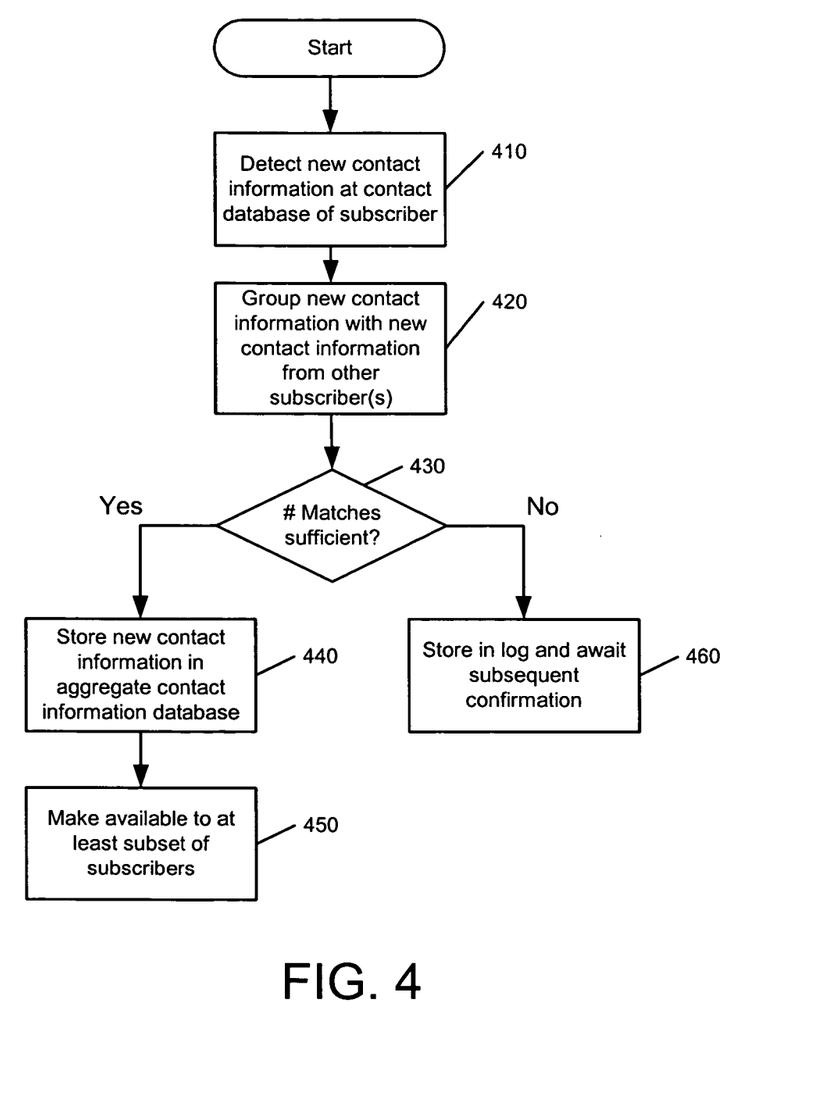

Another technique for obtaining confirmation of new contact information is to identify substantially matching contact information received from multiple subscribers that confirms the accuracy of the new contact information. For example, in some embodiments of the present invention illustrated in FIG. 4, a service provider detects the presence of new contact information in a contact database of one of its subscribers (block 410). The service provider then groups the new contact information with new contact information received from at least one other subscriber that substantially matches the detected new contact information, e.g., with previously detected new contact information that has been buffered, awaiting confirmation (block 420). The service provider then determines if the number of occurrences of substantially matching new contact information exceeds a predetermined threshold (block 430). If yes, the new contact information is stored in the service provider's aggregate contact information database (block 440), where it can be made available to at least some of the subscribers (block 450). If the number of matches is insufficient, the service provider may log the new contact information and await detection of further new substantially matching contact information (block 460).

Figure 5:
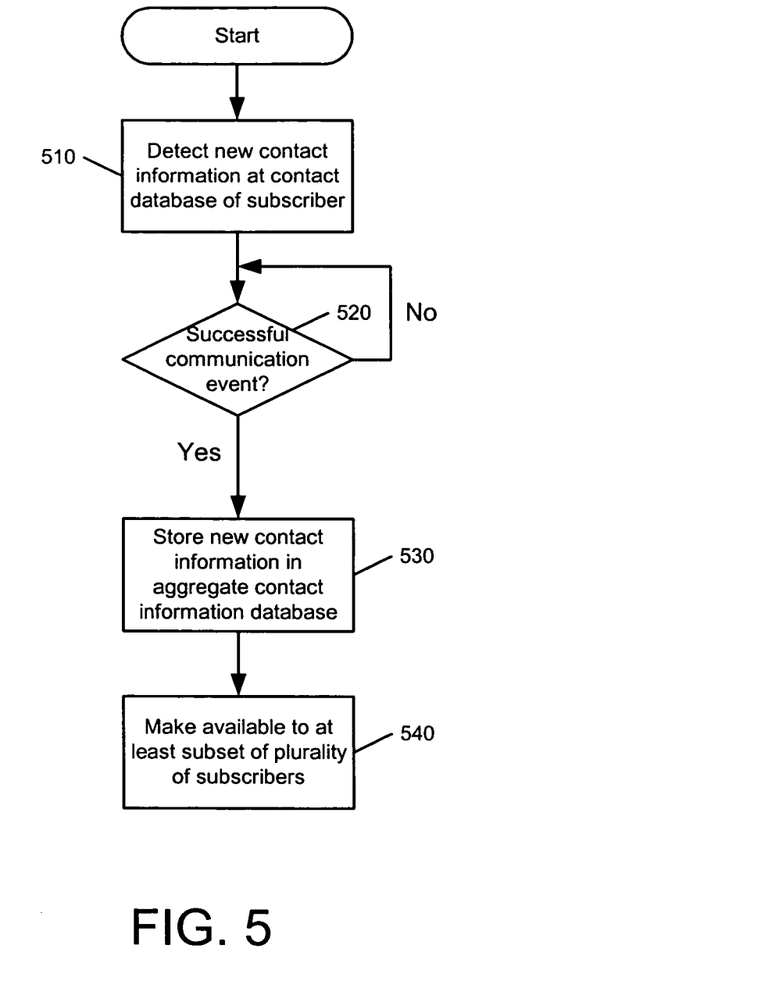

Yet another technique for obtaining confirmation of new contact information involves detecting successful use of the new contact information. For example, referring to FIG. 5, a service provider may detect the presence of new contact information at a contact database of one of its subscribers (block 510). The service provider then determines if the new contact information has been successfully used by the subscriber and/or other subscribers (block 520). For example, if the new contact information is an e-mail address, the service provider could search for a successful e-mail transmission between the subscriber and the contact in question. If a successful communications event is detected, the new contact information is stored in the service provider's aggregate contact database (block 530), and made available to at least a subset of the subscribers (block 540). If not, the service provider may disregard the new contact information and/or hold addition of the contact information to the aggregate database in abeyance pending a successful communications event.

It will be understood that the confirmation techniques described above with reference to FIGS. 3-5 may be used alone or in combination. For example, in some embodiments, a service provide may attempt to confirm new contact information using, for example, the techniques of FIG. 4 and, if the attempt fails, may attempt to obtain confirmation using an inquiry as described with reference to FIG. 2.

Contact information as described herein may include contact identifiers, such as telephone numbers, mailing or other physical addresses, or electronic network addresses, such as e-mail addresses or uniform resource locators (URLs). Contact information may also include other information relating to a contact, such as personal or commercial information. Information for a contact may include personal information, for example, the contact's personal calendar or schedule, a photo of the contact or contact's premises (e.g., for a business), a profile of the contact, a weblog of the contact, a buddy list of the contact, a bookmark list of the contact, and the like.

In some embodiments of the present invention, aggregation of contact information may be used to generate an aggregate database that provides commercial information regarding businesses. For example, contact information for a business contact may include commercial-related information, such as user comments and ratings relating to the business or coupons and ads relating to products or services provided by the business. Such information may be obtained from the address books or other contact databases of subscribers and confirmed and distributed, for example, by processes similar to those described above. For example, contacts may be grouped in an aggregate service provider database and distributed or made available in a "white pages" or "yellow pages" that is enhanced by user input, or may be published, e.g., by address book, web page or email, to selected subscribers. For example, such an enhanced "yellow pages" may aggregate user ratings or reviews and/or may allow subscribers to search based on such terms as name, business type, user ratings, location and the like.

Figure 6:
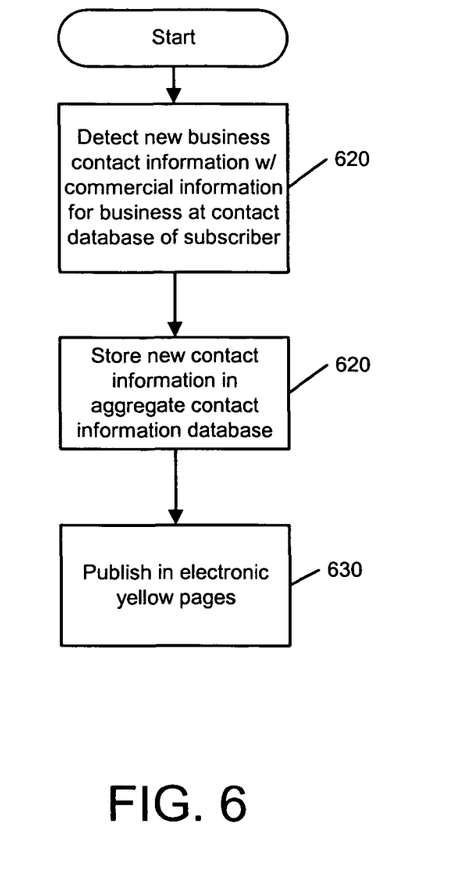

FIG. 6 illustrates operations according to some embodiments of the present invention. A service provider detects the presence of new contact information for a business at a contact database of one of its subscribers (block 610). For example, the new contact information may be new user comments or ratings entered by the subscriber into the subscriber contact database. The service provider stores the new contact information in its aggregate contact information database (block 620). The new information is made available to at least a subset of the service provider's subscribers, e.g., by publishing an electronic "yellow pages" including the new information (block 630).

It will be understood that at least a portion of the communications described herein can be provided according to Session Initiation Protocol (SIP), which is described in more detail in, for example, "Internet Communications Using SIP," by Henry Sinnreich, ISBN: 0-471-41399-2. Internet Protocol communications are generally described in, for example, "TCP/IP Protocol Suite," by Behrouz A Forouzan, ISBN: 0-07-119962-4. Moreover, techniques for the creation and operation of virtual communities, is described in, for example, "Design for Community: The Art of Connecting Real People in Virtual Places," by Derek M. Powazek, ISBN: 0-7357-1075-9. The content these references is incorporated herein by reference.

The communications used for messages may be provided using an Internet Protocol (IP) Multimedia Subsystem (IMS). IMS can utilize a packet switched domain (such as the Internet) to transport multimedia signaling and bearer traffic. The message forwarding may be provided, for example, via a Universal Mobile Telecommunication System (UMTS) to access multimedia services of IMS. IP Multimedia Systems are discussed in each of the following: (1) 3GPP TS 22.228 entitled "Service Requirements for the IP Multimedia Core Network Subsystems"; (2) 3GPP TS 23.228 entitled "IP Multimedia Subsystems"; and (3) 3GPP TR 22.941 entitled "IP Based Multimedia Services Framework." The subject matter of each of these references is hereby incorporated by reference.

It will be understood that messages can be provided via a TCP/IP Session Initiation Protocol (SIP) message, a SS7 (Signaling System 7) message, a common channel signaling message, an in-band signaling message, and/or a Short Message Service (SMS) message, an Enhanced Message Service (EMS) message, a Multimedia Message Service (MMS) message, and/or Smartmessaging™ message. As is known to those skilled in the art, SMS and EMS messages can be transmitted on digital networks, such as GSM networks, allowing relatively small text messages (for example, 160 characters in size) to be sent and received via a network operator's message center to the user device, or via the Internet, using a so-called SMS (or EMS) "gateway."

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A method of operating a communications system having a plurality of personal communication devices that communicate with the communications system, respective ones of the personal communication devices managing respective contact databases that are provided within the respective personal communication devices, the method comprising:
    providing a server that communicates with the personal communication devices over the communications system;
    detecting by the server new contact information for a contact entered in a first contact database within a first one of the personal communication devices;
    in response to detecting entry of the new contact information into the first contact database, obtaining by the server a confirmation of the new contact information independent of the first personal communication device to confirm accuracy of the new contact information; and
    responsive to obtaining the confirmation, storing the new contact information in an aggregate contact database comprising contact data from multiple ones of the plurality of personal communication devices;
    wherein obtaining the confirmation comprises:
    transmitting a confirmation query from the server to the contact to confirm the new contact information that was entered in the first contact database; and
    detecting the confirmation in response to the query;
    wherein obtaining a confirmation comprises:
    grouping the new contact information with new contact information previously received from at least one other personal communication device that matches the new contact information to generate grouped contact information; and
    detecting the confirmations responsive to a number of occurrences of matching new contact information in the grouped contact information exceeding a predetermined threshold.

2. A method of operating a communications system having a plurality of personal communication devices that communicate with the communications system, respective ones of the personal communication devices managing respective contact databases that are provided within the respective personal communication devices, the method comprising:
    providing a server that communicates with the personal communication devices over the communications system;
    detecting by the server new contact information for a contact entered in a first contact database within a first one of the personal communication devices;
    in response to detecting entry of the new contact information into the first contact database, obtaining by the server a confirmation of the new contact information independent of the first personal communication device to confirm accuracy of the new contact information; and
    responsive to obtaining the confirmation, storing the new contact information in an aggregate contact database comprising contact data from multiple ones of the plurality of personal communication devices;
    wherein obtaining the confirmation comprises:
    transmitting a confirmation query from the server to the contact to confirm the new contact information that was entered in the first contact database; and
    detecting the confirmation in response to the query;
    wherein obtaining a confirmation comprises detecting a successful communication by one of the plurality of personal communication devices using the new contact information.

3. The method of claim 1, wherein the new contact information comprises a communications identifier.

4. The method of claim 3, wherein the communications identifier comprises one of an address, a telephone number and an e-mail address.

5. The method of claim 3, wherein the new contact information further comprises personal information for the contact.

6. The method of claim 5, wherein the personal information comprises one of a photograph, a profile, a weblog, a buddy list, a bookmark and a tag.

7. The method of claim 3, wherein the new contact information further comprises commercial information associated with the contact.

8. The method of claim 7, wherein the commercial information comprises a user rating.

9. The method of claim 7, further comprising providing access to the commercial information in the aggregate database to a second one of the personal communication devices.

10. The method of claim 9, wherein providing access to the commercial information in the aggregate database to a second one of the personal communication devices comprises publishing the commercial information in a database available to at least a subset of the plurality of personal communication devices.

11. The method of claim 1, further comprising providing access to the new contact information in the aggregate database to a second one of the personal communication devices.

12. The method of claim 1, wherein detecting the new contact information for a contact entered by a first one of the personal communication devices in the first contact database comprises detecting a constraint on distribution of the new contact information, and wherein storing the new contact information in the aggregate contact database is followed by limiting access of the plurality of personal communication devices to the new contact information in the aggregate contact database according to the constraint.

* * * * *

UNITED STATES PATENT AND TRADEMARK OFFICE
CERTIFICATE OF CORRECTION

| | | |
|---|---|---|
| PATENT NO. | : 9,491,275 B2 | Page 1 of 1 |
| APPLICATION NO. | : 11/321336 | |
| DATED | : November 8, 2016 | |
| INVENTOR(S) | : John Ruckart | |

It is certified that error appears in the above-identified patent and that said Letters Patent is hereby corrected as shown below:

In the Claims

Column 7, Claim 1, Line 49:
Please correct "detecting the confirmations" to read -- detecting the confirmation --

Signed and Sealed this
First Day of August, 2017

Joseph Matal
*Performing the Functions and Duties of the*
*Under Secretary of Commerce for Intellectual Property and*
*Director of the United States Patent and Trademark Office*